United States Patent
Lund et al.

(10) Patent No.: US 7,263,557 B2
(45) Date of Patent: Aug. 28, 2007

(54) METHOD AND APPARATUS TO DETECT CONFIGURATION INFORMATION FOR A DIGITAL SUBSCRIBER LINE DEVICE

(75) Inventors: Sven O. Lund, Holte (DK); Niels Beier, Copenhagen (DK)

(73) Assignee: Intel Corporation, Santa Clara, CA (US)

( * ) Notice: Subject to any disclaimer, the term of this patent is extended or adjusted under 35 U.S.C. 154(b) by 854 days.

(21) Appl. No.: 10/027,716

(22) Filed: Oct. 24, 2001

(65) Prior Publication Data

US 2003/0078999 A1  Apr. 24, 2003

(51) Int. Cl.
*G06F 15/16* (2006.01)

(52) U.S. Cl. ............... 709/228; 709/220; 709/222; 709/227; 709/230; 709/248; 370/235; 370/252; 370/395.31; 370/395.61

(58) Field of Classification Search .......... 709/220, 709/227, 230, 222, 228, 248; 370/235, 252, 370/395.31, 395, 395.61
See application file for complete search history.

(56) References Cited

U.S. PATENT DOCUMENTS

| | | | |
|---|---|---|---|
| 5,608,720 A * | 3/1997 | Biegel et al. ............... 370/249 |
| 5,650,994 A * | 7/1997 | Daley ......................... 370/259 |
| 5,666,293 A * | 9/1997 | Metz et al. .................. 709/220 |
| 6,229,810 B1 * | 5/2001 | Gerszberg et al. .......... 370/401 |
| 6,597,689 B1 * | 7/2003 | Chiu et al. ................... 370/354 |
| 6,700,890 B1 * | 3/2004 | Langley et al. ......... 370/395.31 |
| 6,711,137 B1 * | 3/2004 | Klassen et al. .............. 370/252 |
| 6,785,237 B1 * | 8/2004 | Sufleta ........................ 370/236 |
| 6,904,020 B1 * | 6/2005 | Love et al. .................. 370/252 |
| 6,990,110 B2 * | 1/2006 | Nattkemper et al. ........ 370/397 |
| 6,993,048 B1 * | 1/2006 | Ah Sue ....................... 370/493 |
| 2002/0021717 A1 * | 2/2002 | Hedayat et al. ............. 370/508 |
| 2002/0150108 A1 * | 10/2002 | Nattkemper et al. ........ 370/397 |
| 2003/0208609 A1 * | 11/2003 | Brusca ........................ 709/230 |

OTHER PUBLICATIONS

TR-037, "Auto-Configuration for the Connection Between the DSL Broadband Network Termination (B-NT) and the Network using ATM", Mar. 2001, DSL Forum Technical Report, pp. 1-10.*

* cited by examiner

*Primary Examiner*—Michael Y. Won
(74) *Attorney, Agent, or Firm*—Kacvinsky LLC

(57) ABSTRACT

A method and apparatus to detect configuration information that may be used to configure a permanent virtual circuit (PVC) between a digital subscriber line (DSL) customer premise equipment (CPE) and a DSL access module (DSLAM) is described.

11 Claims, 6 Drawing Sheets

METHOD AND APPARATUS TO DETECT CONFIGURATION INFORMATION FOR A DIGITAL SUBSCRIBER LINE DEVICE

BACKGROUND

As reliance on network communications increases, so does the desire for high-speed network access. One popular technique for providing high-speed network access is digital subscriber line (DSL) technology. DSL technology may be implemented with reduced infrastructure costs through the use of conventional twisted-pair copper wires, which are already present in many homes and offices. As a result of the many advantages offered by DSL technology, there may be a substantial need for new and improved DSL technologies to further enhance these advantages while overcoming conventional limitations.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
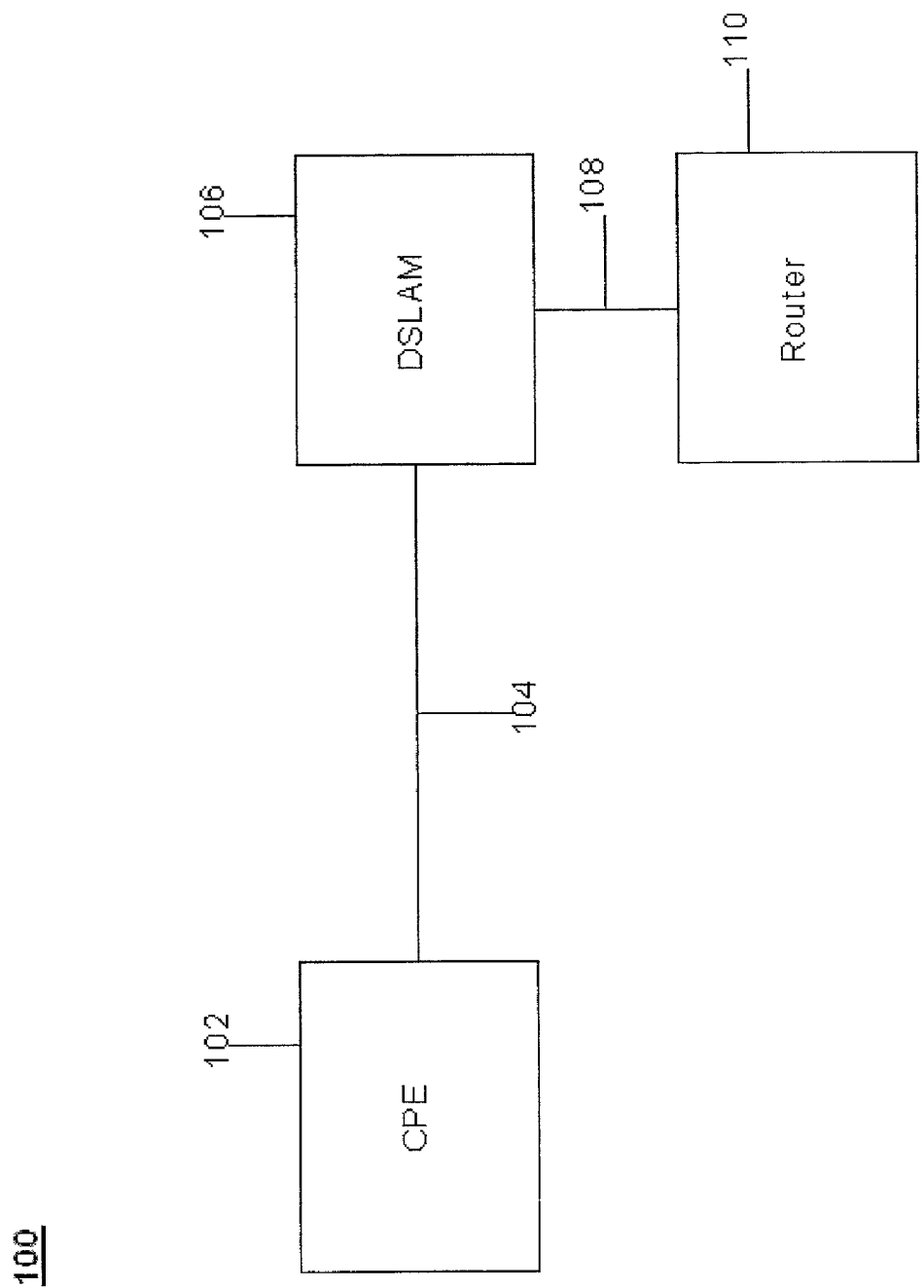
FIG. 1 is a system suitable for practicing one embodiment of the invention.

Embodiments of the invention may comprise a method and apparatus to automatically detect configuration information for a DSL device. For example, the embodiments of the invention may automatically detect configuration information that may be used to configure a permanent virtual circuit (PVC) between a DSL customer premise equipment (CPE) and a DSL access module (DSLAM). This may be advantageous, for example, when different providers produce the DSL CPE and DSLAM. In this situation, the DSL CPE and DSLAM may not share the same PVC configuration information. Conventional techniques to handle this mismatch are unsatisfactory for a number of reasons, as detailed further below.

In this detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

An embodiment of the invention may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a CPE 102 connected to a DSLAM 106 via connection 104. DSLAM 106 may be connected to a network device, such as router 110 via connection 108. CPE refers to a device located at a client or customer location, which may comprise hardware and/or software to communicate over a network to another device. Examples of CPE may include a DSL or asymmetric DSL (ADSL) router, a DSL or ADSL bridge, a DSL or ADSL modem, and so forth. The term "CPE" as used herein may refer to both CPE and DSL CPE. In one embodiment of the invention, CPE 102 may comprise a DSL CPE. The term DSL CPE as used herein may refer to any DSL device that is located at a customer or client location. DSLAM 106 may be located, for example, at a telephone central office (TELCO).

A user may establish a DSL connection between CPE 102 and DSLAM 106 using a number of well-known protocols, such as a High-level Data Link Control (HDLC), International Organization for Standardization, ISO/IEC 3309, adopted in 1993, Asynchronous Transfer Mode (ATM) layer specification, International Telecommunication Union (ITU) Recommendation I.361, adopted in February 1999 ("ATM Specification"), Asynchronous Transfer Mode Forum and Frame-based User-Network Interface (ATM FUNI), The ATM Forum Technical Committee, defined in Frame Based User-To-Network Interface Specification v2.0, AF-SAA-0088.000, July 1997. DSL CPE and DSLAMS are typically configured to communicate using one or more such protocols.

The ATM protocol as described in the ATM Specification is becoming increasingly popular for use in high-speed networks, particularly as used in combination with DSL technology. ATM is a connection-orientated protocol and as such there is a connection identifier in every cell header that explicitly associates a cell with a given virtual channel on a physical link. The connection identifier may consist of two sub-fields, the virtual channel identifier (VCI) and the virtual path identifier (VPI). Together, the VCI and VPI are used in multiplexing, de-multiplexing and switching a cell through the network. VCIs and VPIs are not necessarily addresses. They may be explicitly assigned at each segment (link between ATM nodes) of a connection when a connection is established, and remain for the duration of the connection. Using the VCI/VPI the ATM layer can asynchronously interleave (multiplex) cells from multiple connections.

An ATM connection may be of two types, often referred to as a permanent virtual circuit (PVC) and a switched virtual circuit (SVC). A SVC may be a temporary virtual circuit that is set up and used only as long as data is being transmitted. Once the communication between the two hosts is complete, the SVC disappears. By way of contrast, a PVC remains available at all times.

During the initial deployment of a CPE 102, it may be desirable to configure a PVC between CPE 102 and DSLAM 106. Certain configuration information may be needed to configure the PVC between CPE 102 and DSLAM 106. The configuration information may comprise, for example, a VCI and VPI as described above.

As mentioned previously, a problem may arise due to a mismatch in configuration information provisioned in the CPE and DSLAM. Frequently, the CPE and DSLAM are made by different vendors, and therefore do not provision their equipment with the same configuration information. For example, the VCI and VPI values stored in the CPE may not be the same VCI and VPI values stored in the DSLAM. As a result, when a new CPE is deployed at a user location, a PVC between the CPE and DSLAM may not be configured absent some external mechanism. For example, a user may have to manually enter the configuration information for the CPE, which may often be a tedious and time-consuming process, particularly with a large number of CPE deployments.

Another attempt to handle this mismatch is to automatically configure (auto-configure) a PVC. The term "automatically configure," "auto-configure," and its variants may be defined herein to mean configuration of a PVC with limited human intervention. A number of PVC automated configuration solutions currently exist, such as those described in the DSL Forum PVC Auto-Configuration Standard Specification, TR-037, the ATM Forum Integrated Local Management Interface (ILMI) Specification, AF-ILMI-0065, the ATM Forum PVC Auto-Configuration Specification, AF-NM-0122. Another technique referred to as "PVC Hunting" may also be used to automatically configure a PVC. PVC Hunting entails having the CPE passively listen to the received cell stream and determine an active PVC and associated configuration information from good cell headers.

The embodiments of the invention may comprise a new PVC auto-configuration algorithm that may be used to detect configuration information for a CPE. In one embodiment of the invention, this may be accomplished using a list of probe values ("VC Table"). The term "probe values" as used herein may refer to values for a virtual circuit, such as a PVC. The values may comprise, for example, a VCI and VPI. Test packets may be sent using the probe values to a DSLAM.

The term "test packets" as used herein may include packets designed specifically for testing purposes, and also packets sent between a CPE and DSLAM in accordance with normal data flow, such as for a conventional protocol. The DSLAM may reject or drop packets with unknown PVC values. If the DSLAM receives a packet with recognized PVC values, the DSLAM may send a response packet to the originating CPE. Alternatively, the DSLAM may pass the test packet to another network device attached to the same network as the DSLAM and CPE, and the network device may send a response packet to the originating CPE. Examples of such network devices might include a router, bridge, gateway, switch and so forth. Once the response packet is received, the CPE may retrieve the PVC configuration information from the header of the response packet. The CPE may then configure the PVC using the retrieved configuration information.

Figure 2:
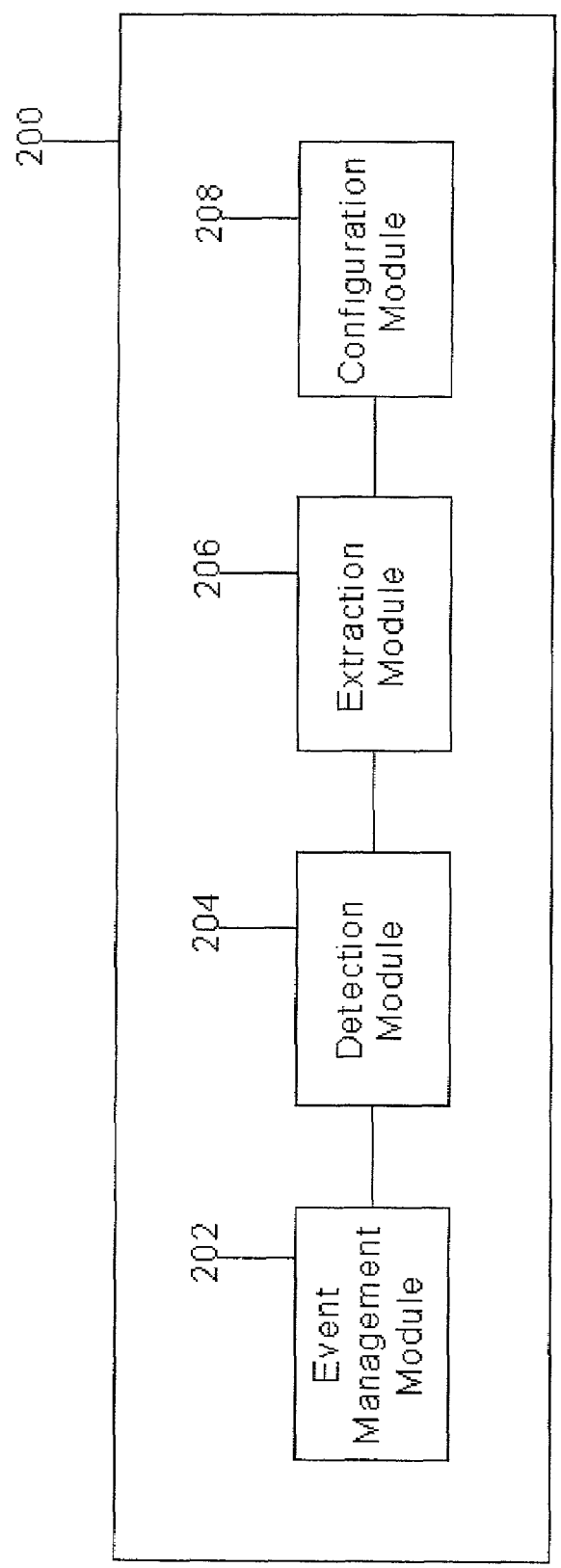
FIG. 2 is a block diagram of a probing module in accordance with one embodiment of the invention.

FIG. 2 is a block diagram of a probing module in accordance with one embodiment of the invention. FIG. 2 illustrates a probing module 200 that may be implemented as part of, for example, CPE 102. Probing module 200 may include an event management module 202, a detection module 204, an extraction module 206 and a configuration module 208. As stated previously, each of these modules may be implemented in software, hardware or a combination of both. Further, it can be appreciated that the functionality for probing module 200 may be implemented using more modules, or by combining these modules into fewer modules, and still fall within the scope of the invention.

During an initialization or start-up process for a CPE such as CPE 102, it may be determined that a PVC is desired to communicate with a DSLAM, such as DSLAM 106. To accomplish this, event management module 202 of probing module 200 may access a VC Table. The VC Table may include a list of probe values. In one embodiment of the invention the probes values may be, for example, a VCI and/or VPI. Event management module 202 may use the VC Table to send test packets with different probe values to a DSLAM, such as DSLAM 106. Detection module 204 may detect a response packet to one or more of the test packets. The response packet may originate, for example, from DSLAM 106 or Router 110. The response packet may also include a header having configuration information for a PVC. Extraction module 206 may extract the configuration information from the response packet, and pass the configuration information to configuration module 208. Configuration module 208 may use the configuration information to configure the PVC between the CPE and DSLAM.

The operations of systems 100 and 200 may be further described with reference to FIGS. 3-6 and accompanying examples. Although FIGS. 3-6 presented herein may include a particular processing logic, it can be appreciated that the processing logic merely provides an example of how the general functionality described herein can be implemented. Further, each operation within a given processing logic does not necessarily have to be executed in the order presented unless otherwise indicated. In one embodiment of the invention, the programming logic of FIGS. 3-6 may be implemented using a processor and appropriate software comprising computer program segments.

Figure 3:
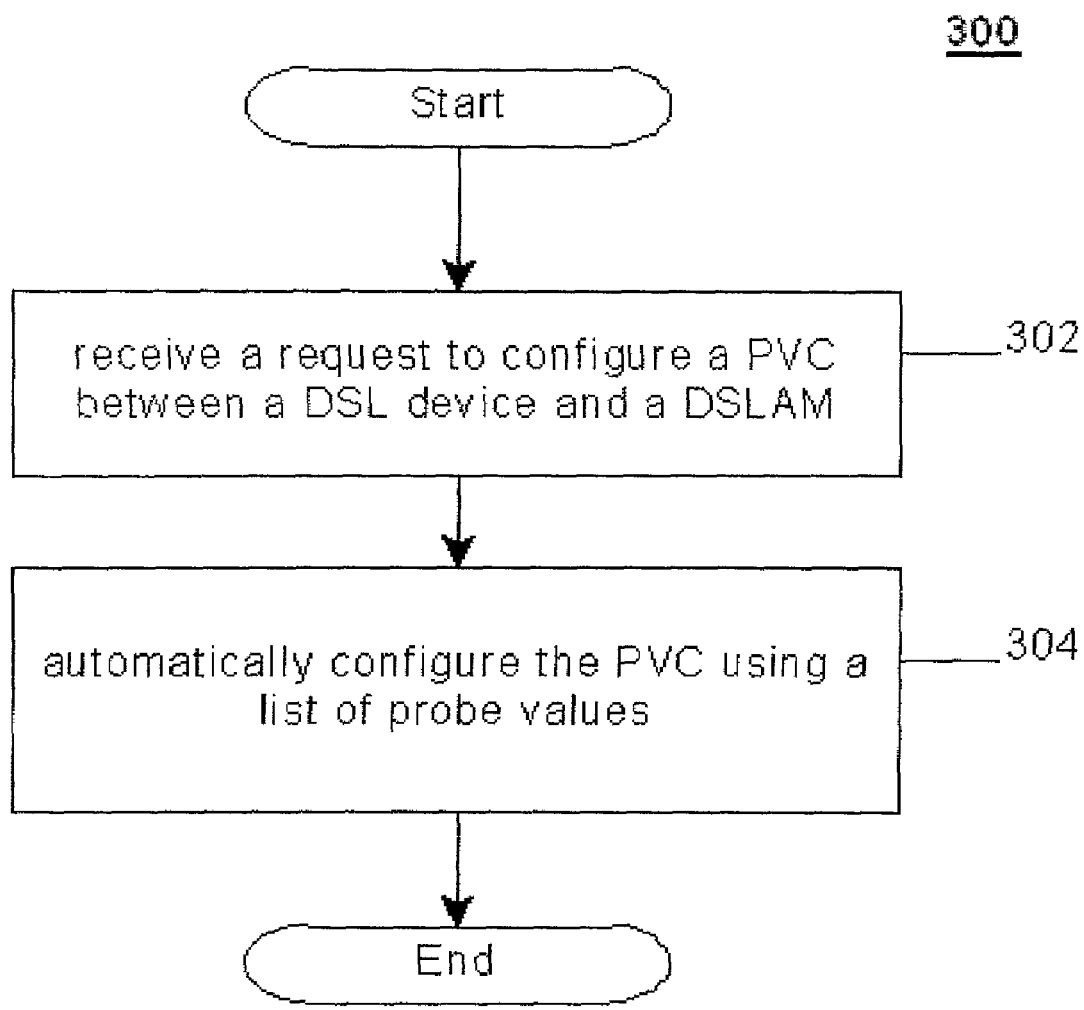
FIG. 3 is a first block flow diagram of the programming logic that may be performed by a probing module in accordance with one embodiment of the invention.

FIG. 3 is a first block flow diagram of the programming logic that may be performed by a probing module in accordance with one embodiment of the invention. In one embodiment of the invention, the probing module may refer to the software and/or hardware used to implement the functionality for PVC auto-configuration as described herein. In this embodiment of the invention, the probing module may be implemented as part of CPE 102. It can be appreciated that this functionality, however, may be implemented by any device, or combination of devices, located anywhere in a communication network accessible by CPE 102 and DSLAM 106 and still fall within the scope of the invention.

FIG. 3 illustrates a programming logic 300 to configure a network device, such as a DSL CPE. A request to configure a first PVC between a DSL device and a DSLAM is received at block 302. The first PVC is automatically configured using a list of probe values stored as part of the VC Table at block 304. An example of a VC Table is shown below as Table 1.

TABLE 1

| Probe Value Index | VPI (N) | VCI (M) |
| --- | --- | --- |
| Probe Value [0, 0] | 0 | 35 |
| Probe Value [1, 1] | 0 | 32 |
| Probe Value [N, M] | 1 | 1 |

As shown in Table 1, a probe value may comprise a VPI and a VCI. Different CPE vendors may use different VPI and VCI values. For example, Probe Value [0, 0] may include a VPI=0 and a VCI=35. This is the default values used with CPE equipment provided by Alcatel. In another example, Probe Value [1, 1] may include a VPI=0 and a VCI=32, which are the default values used with CPE equipment provided by Siemens AG. In yet another example, Probe Value [N, M] may include a VPI=1 and a VCI=1, which are the default values used with CPE equipment provided by Cisco Systems, Inc. A DSLAM, such as DSLAM 106, however, may not be provisioned with these default values, therefore creating a potential mismatch during the automatic configuration of a PVC between a CPE and DSLAM.

Figure 4:
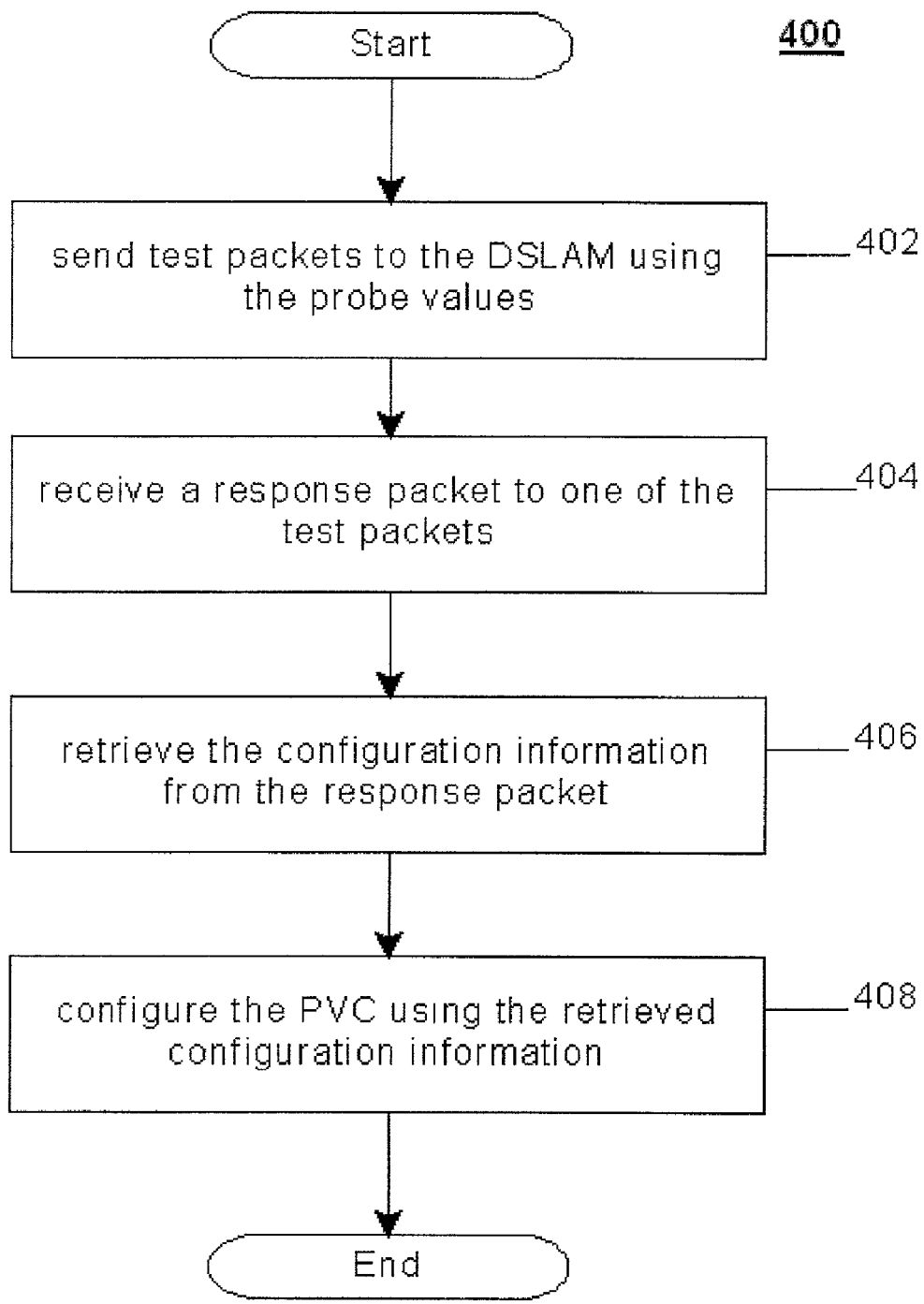
FIG. 4 is a second block flow diagram of programming logic that may be performed by a probing module in accordance with one embodiment of the invention.

FIG. 4 is a second block flow diagram of programming logic that may be performed by a probing module in accordance with one embodiment of the invention. FIG. 4 illustrates a programming logic 400. Programming logic 400 is an example of how the first PVC may be automatically configured. Test packets may be sent to a DSLAM, with each test packet having a probe value from the VC Table, at block 402. A response packet to one of the test packets may be received at block 404. Configuration information may be retrieved from the response packet at block 406. The PVC may be configured using the retrieved configuration information.

Figure 5:
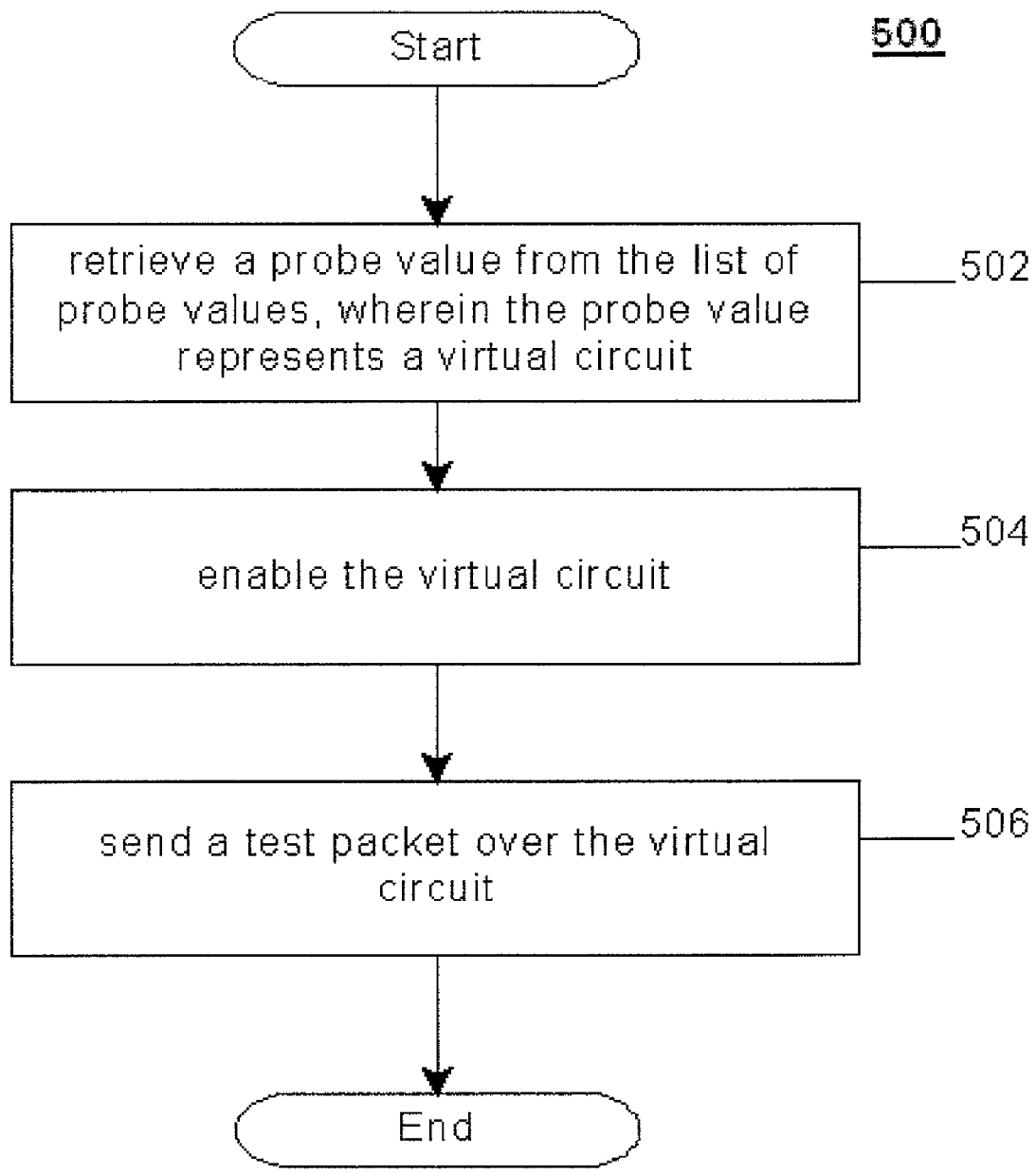
FIG. 5 is a third block flow diagram of programming logic that may be performed by a probing module in accordance with one embodiment of the invention.

FIG. 5 is a third block flow diagram of programming logic that may be performed by a probing module in accordance with one embodiment of the invention. FIG. 5 illustrates a programming logic 500. Programming logic 500 is an example of test packets may be sent by, for example, a probing module such as probing module 200. A probe value may be retrieved from a list of probe values stored in the VC Table at block 502. In one embodiment of the invention the probe value may represent a virtual circuit as identified by a VPI and/or VCI. The virtual circuit may be enabled at block 504. Once enabled, a test packet may be sent over the virtual circuit at block 506.

In one embodiment of the invention, a response packet may indicate which virtual circuit is appropriate for use as a PVC. Therefore, those virtual circuits that were enabled but did not receive a response packet may be disabled, thereby releasing resources that may be used for other connections.

In one embodiment of the invention, a CPE may use more than one PVC. In this case, configuration module 208 of probing module 200 may be used to configure multiple PVCs for the CPE. To configure multiple PVCs between a CPE and DSLAM, the configuration module may need additional information from a user of the CPE. The configuration module may therefore also include a user interface to allow a user to access certain functionality for the probing module in general and the configuration module in particular, such as providing configuration information for one or more PVCs, modifying time out periods for the PVC auto-configuration process, disabling certain PVC auto-configuration functions, and so forth.

One embodiment of invention may be used to configure a second PVC as follows. A request to configure a second PVC for said DSL device may be received, along with configuration information for the second PVC. The configuration information may comprise, for example, a VCI and a VPI. The configuration module may then complete the configuration process for the second PVC using the configuration information.

In one embodiment of the invention, a terminating condition may occur prior to completing configuration of the first PVC. In this case, the first PVC may be manually configured. For example, a notice message indicating that the first PVC was not configured may be sent to a user. Configuration information for the first PVC may be received from the user via the user interface.

Figure 6:
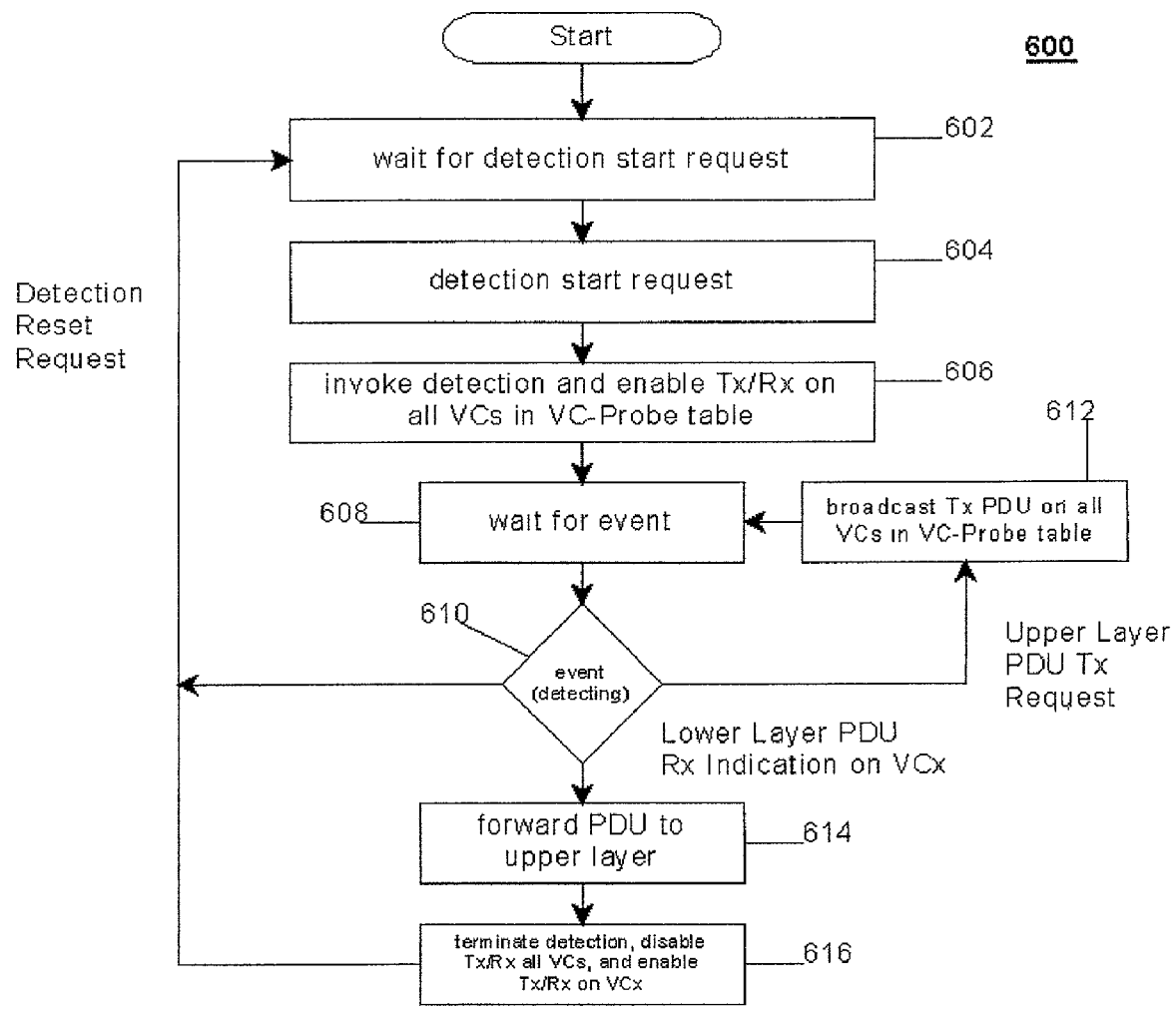
FIG. 6 is a fourth block flow diagram of programming logic that may be performed by a probing module in accordance with one embodiment of the invention.

FIG. 6 is a fourth block flow diagram of programming logic that may be performed by a probing module in accordance with one embodiment of the invention. FIG. 6 illustrates a programming logic 600. Programming logic 600 begins by waiting for a detection start request at block 602. Block 602 may be an idle state waiting to receive a request to being probing for configuration information. A detection start request may be received at block 604. The detection start request may originate from a initialization sub-routine that is executed, for example, upon start-up of a CPE. Once the detection start request is received, the probing module may begin the probing and configuration process by enabling transmit (Tx) and receive (Rx) functions for all virtual circuits as represented by probe values in the VC Table at block 606.

Programming logic 600 may invoke a monitoring sub-routine at block 608. The monitoring sub-routine may wait for a predefined event, such as receipt of a response packet or configuration packet from a DSLAM, for example. A determination is made at block 610 as to whether an event has been detected. If no events have been detected, a request to send test packets may be sent to block 612. The test packets may be, for example, ATM adaptation layer (AAL) protocol data units (PDUs). Block 612 may initiate the broadcasting of transmit AAL PDUs to the DSLAM on all virtual circuits as represented by probe values stored as part of the VC Table. In the event of a terminating condition, such as a time-out, a detection reset request may be forwarded to block 602 at block 610.

The test packets may be received by the DSLAM. The DSLAM may discard any invalid test packets, such as those test packets received on unknown virtual circuits. The DSLAM may then forward the test packet to another network device on the configured virtual circuit. The network device may be part of the backbone network, such as router 110, for example. The router 110 on the backbone network may respond to the test packet in the form of an AAL PDU, and the response may be forwarded to the DSLAM, and from the DSLAM to the CPE on the configured virtual circuit. The CPE may now be able to detect the configured virtual circuit through the received AAL PDU. Alternatively, the DSLAM may send the response packet to the originating CPE without passing it to another network device.

Once the test packets or PDUs are sent to the DSLAM at block 612, the monitoring sub-routine at block 608 may wait for a predefined event, such as receipt of a response packet to one of the test packets. The monitoring sub-routine may listen for received AAL PDUs on the same list of virtual circuits used to send the test packets. A determination is made at block 610 as to whether a response packet has been received. If a response packet has been received, a message is passed to block 614 that a response packet has been received, and the virtual circuit over which it was received. The response packet or PDU is forwarded to another sub-routine on a different networking layer, and may be used to validate and store configuration information to establish a PVC for the CPE. The detecting process may be terminated at block 616. The Tx and RX functions for all virtual circuits that did not receive a response packet may also be disabled or turned off at block 616. Finally, a message may be sent to permanently enable the virtual circuit (VCx) that received a response packet at block 616, and control may be passed to block 602 for the next detection start request.

The operation of systems 100 and 200, and the processing logic shown in FIGS. 3-6 may be better understood by way of example. Assume a CPE is scheduled for deployment. The CPE may be, for example, a CPE to deliver ATM over DSL, such as a DSL/ATM router, an ADSL/ATM router, a DSL/ATM bridge, an ADSL/ATM bridge, a DSL or ADSL modem, and so forth. The DSL CPE is connected to a TELCO DSLAM over a communications medium, such as twisted-pair copper wire. Power is delivered to the DSL CPE, and an initialization routine is started. Part of the initialization routine may be to detect whether a PVC has been configured for the DSL CPE. If there is no PVC configured for the DSL CPE, a request to configure a PVC between the DSL CPE and the DSLAM is sent to probing module 200. Upon receiving the configuration request, event management module 202 of probing module 200 may access probe values stored in a VC Table, such as the VC Table illustrated as Table 1. Event management module 202 may enable virtual circuits represented by the probe values, and begin sending test packets to the DSLAM using the probe values. For example, probe value [1, 1] would be used to construct a virtual circuit, with the virtual circuit being identified with a VPI of 0 and a VCI of 35.

Detection module 204 may remain in an idle state and monitor for response packet(s) from the DSLAM or some other network device (e.g., router 100). Once a response packet is received, detection module 204 may notify extraction module 206 of the response packet. Detection module 204 may perform some clean-up operations as well, such as shutting down or disabling those virtual circuits that did not receive a response packet. For example, if a response packet was received over the virtual circuit having a VPI of 0 and VCI of 35, all other virtual circuits may be disable to release resources for other connections.

Extraction module 206 may be used to extract configuration information resulting from receipt of a response packet. The configuration information may be extracted, for example, from a cell header from the response packet. The configuration information may also be retrieved using the probe values that were used to enable the virtual circuit that received the response packet. Extraction module 206 may also validate that the virtual circuit is a valid virtual circuit by sending additional test packets, of the same kind sent initially or of different types to further test the connection.

Once validated, configuration module 208 may store the configuration information, and permanently activate and identify the virtual circuit identified by the configuration information as the PVC between the CPE and DSLAM. Configuration module 208 may then send a message to a user indicating configuration is complete for the PVC. It is worthy to note that the probing process may be executed during other times in addition to CPE initialization and still fall within the scope of the invention. For example, the probing process may be used to set up a PVC for a particular session, or upon delivery of power to the CPE. The probing process may also be performed once, with the PVC configuration information being stored for subsequent sessions.

In one embodiment of the invention, a terminating condition may occur prior to completing configuration of the PVC. In this case, the PVC may be manually configured. For example, a notice message indicating that the PVC was not configured may be sent to a user. Configuration information for the PVC may be received from the user via the user interface. Configuration module 208 may use the configuration information to complete the PVC configuration process.

In some cases the DSL CPE will use multiple PVCs. In this case, the probing module may configure multiple PVCs for the CPE. This may be accomplished by having configuration information for the additional PVCs manually configured using, for example, the user interface. For example, configuration module 208 may receive a request to configure a second PVC for the DSL device, along with configuration information for the second PVC. Upon detection of configuration information included as part of the configuration request, configuration module 208 may store the configuration information and active the second PVC. A PVC configuration complete message may then be sent to the user. This process may be repeated for any number of PVCs desired for a particular DSL CPE.

Broadcasting test packets may introduce additional load on a communication line or network, and there may be a practical upper limit on the number of active virtual circuit probes that may be handled by the network. During actual detection, the traffic may be limited since there are no logical connections established at this stage. In one embodiment of the invention, the load in the transmit direction may be controlled by conventional high water marks on the transmission queues, for example.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to configure a network device, comprising:
  receiving a request at a DSL access module (DSLAM) to configure a permanent virtual circuit (PVC) between a digital subscriber line (DSL) device and said DSLAM, said DSL device having a virtual circuit (VC) table with multiple probe values, wherein said probe value represents a virtual circuit; and
  automatically configuring said PVC using a list of probe values from said VC table sent with test packets to probe for configuration information for said PVC, and using said configuration information to configure said PVC, wherein said probe values and said configuration information comprise a virtual channel identifier (VCI) and a virtual path identifier (VPI);
wherein said automatically configuring comprises:
sending test packets to said DSLAM using said probe values;
receiving a response packet to one of said test packets;
retrieving said configuration information from said response packet;
configuring said PVC using said retrieved configuration information; and
further disabling each virtual circuit that does not receive a response packet.

2. The method of claim 1, wherein for each probe value in said VC table said sending comprises:
retrieving a probe value from said list of probe values;
enabling said virtual circuit; and
sending a test packet over said virtual circuit.

3. The method of claim 1, further comprising:
receiving a request to configure a second PVC for said DSL device;
receiving configuration information for said second PVC; and
configuring said second PVC using said configuration information.

4. The method of claim 1, further comprising:
determining that a terminating condition has occurred prior to automatically configuring said PVC; sending a message that said PVC was not configured to a user; and receiving said configuration information for said PVC from a user.

5. A system to configure a network device, comprising:
a digital subscriber line (DSL) customer premise equipment (CPE), said DSL CPE having a virtual circuit (VC) table with multiple probe values, wherein said probe value represents a virtual circuit;
a DSL access module (DSLAM) connected to said DSL CPE; and
a DSL probing module to use said list of probe values from said VC table sent with test packets to said (DSLAM) to probe for configuration information for use in automatically configuring a permanent virtual circuit (PVC) between said DSL CPE and said DSLAM, wherein said probe values and said configuration information comprise a virtual channel identifier (VCI) and a virtual path identifier (VPI);
wherein said automatically configuring comprises:
sending test packets to said DSLAM using said probe values;
receiving a response packet to one of said test packets;
retrieving said configuration information from said response packet;
configuring said PVC using said retrieved configuration information and
further disabling each virtual circuit that does not receive a response packet.

6. The system of claim 5, wherein said DSL CPE comprises a DSL CPE consisting essentially one of the following: a DSL/asynchronous transfer mode (ATM) router, an asymmetric DSL (ADSL)/ATM router, a DSL/ATM bridge, an ADSL/ATM bridge, a DSL modem, and an ADSL modem.

7. A probing module for a network device, comprising:
an event management module which accesses a virtual circuit (VC) table that includes a list of probe values, wherein said probe value represents a virtual circuit, to automatically send test packets using said probe values from a digital subscriber line (DSL) device to a DSL access module (DSLAM);
a detection module to detect a packet received in response to at least one of said test packets and to disable each virtual circuit that does not receive a response packet;
an extraction module to retrieve configuration information from said received packet; and
a configuration module to configure a permanent virtual connection between said DSL and said DSLAM using said configuration information, wherein said probe values and said configuration information comprise a virtual channel identifier (VCI) and a virtual path identifier (VPI).

8. An article comprising:
a storage medium;
said storage medium including stored instructions that, when executed by a processor, result in configuring a network device by receiving a request at a DSL access module (DSLAM) to configure a permanent virtual circuit (PVC) between a digital subscriber line (DSL) device and said (DSLAM), said DSL device having a virtual circuit (VC) table with multiple probe values, wherein said probe value represents a virtual circuit, automatically configuring said PVC using a list of probe values from said VC table sent with test packets to probe for configuration information for said PVC, and using said configuration information to configure said PVC, wherein said probe values and said configuration information comprise a virtual channel identifier (VCI) and a virtual path identifier (VPI), said automatically configuring said PVC comprising sending test packets to said DSLAM using said probe values, receiving a response packet to one of said test packets, retrieving said configuration information from said response packet, and configuring said PVC using said retrieved configuration information and further disabling each virtual circuit that does not receive a response packet.

9. The article of claim 8, wherein the stored instructions, when executed by a processor, result in sending test packets, for each probe value in said VC table, by retrieving a probe value from said list of probe values, enabling said virtual circuit, and sending a test packet over said virtual circuit.

10. The article of claim 8, wherein the stored instructions, when executed by a processor, further result in receiving a request to configure a second PVC for said DSL device, receiving configuration information for said second PVC, and configuring said second PVC using said configuration information.

11. The article of claim 8, wherein the stored instructions, when executed by a processor, further result in determining that a terminating condition has occurred prior to automatically configuring said. PVC, sending a message that said PVC was not configured to a user, and receiving said configuration information for said PVC from a user.

* * * * *